United States Patent
Gretz

(10) Patent No.: US 7,476,807 B1
(45) Date of Patent: Jan. 13, 2009

(54) ELECTRICAL BOX ASSEMBLY INCLUDING ADJUSTABLE BRACKET

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 12/151,544

(22) Filed: May 7, 2008

(51) Int. Cl.
*H01H 9/02* (2006.01)

(52) U.S. Cl. .............................. 174/58; 174/50; 174/62; 174/64; 174/54; 174/135; 220/4.02; 248/906; 439/535; 361/600

(58) Field of Classification Search .................. 174/53, 174/50, 54, 57, 61, 63, 64, 135, 62, 59, 58; 220/3.3, 3.4, 3.5, 3.8, 4.02, 3.7; 248/121, 248/126, 906, 200, 205.1, 218.4, 300; 361/600, 361/826; 439/535
See application file for complete search history.

(56) References Cited

U.S. PATENT DOCUMENTS

| | | | |
|---|---|---|---|
| 2,757,817 A * | 8/1956 | Egan ........................ 220/3.5 |
| 3,767,151 A | 10/1973 | Seal et al. |
| 3,926,330 A * | 12/1975 | Deming et al. ................ 220/3.9 |
| 3,972,498 A | 8/1976 | Paskert |
| 4,057,164 A | 11/1977 | Maier |
| 4,185,566 A * | 1/1980 | Adams ........................ 108/152 |
| 4,898,357 A | 2/1990 | Jorgensen et al. |
| 5,031,789 A | 7/1991 | Dauberger |
| 6,831,228 B2 * | 12/2004 | Lalancette et al. ............. 174/58 |

* cited by examiner

*Primary Examiner*—Dhiru R Patel

(57) ABSTRACT

An electrical box assembly for providing a secure electrical enclosure on walls constructed with steel studs of two conventional sizes. The electrical box assembly includes an electrical box including captive fasteners on one sidewall and a bracket that is adjustable in length for attachment to the opposite sidewall. The adjustable length bracket may be used as is for bracing the opposite sidewall of the electrical box for a wide stud. A bend line is provided on the bracket for enabling simple reduction of its length for bracing the electrical box against a narrow stud. The electrical box assembly provides an electrical box that is fastened directly to a stud on one sidewall and braced against the drywall at both ends of the box on the opposite sidewall to securely hold the electrical box with respect to the wall.

18 Claims, 12 Drawing Sheets

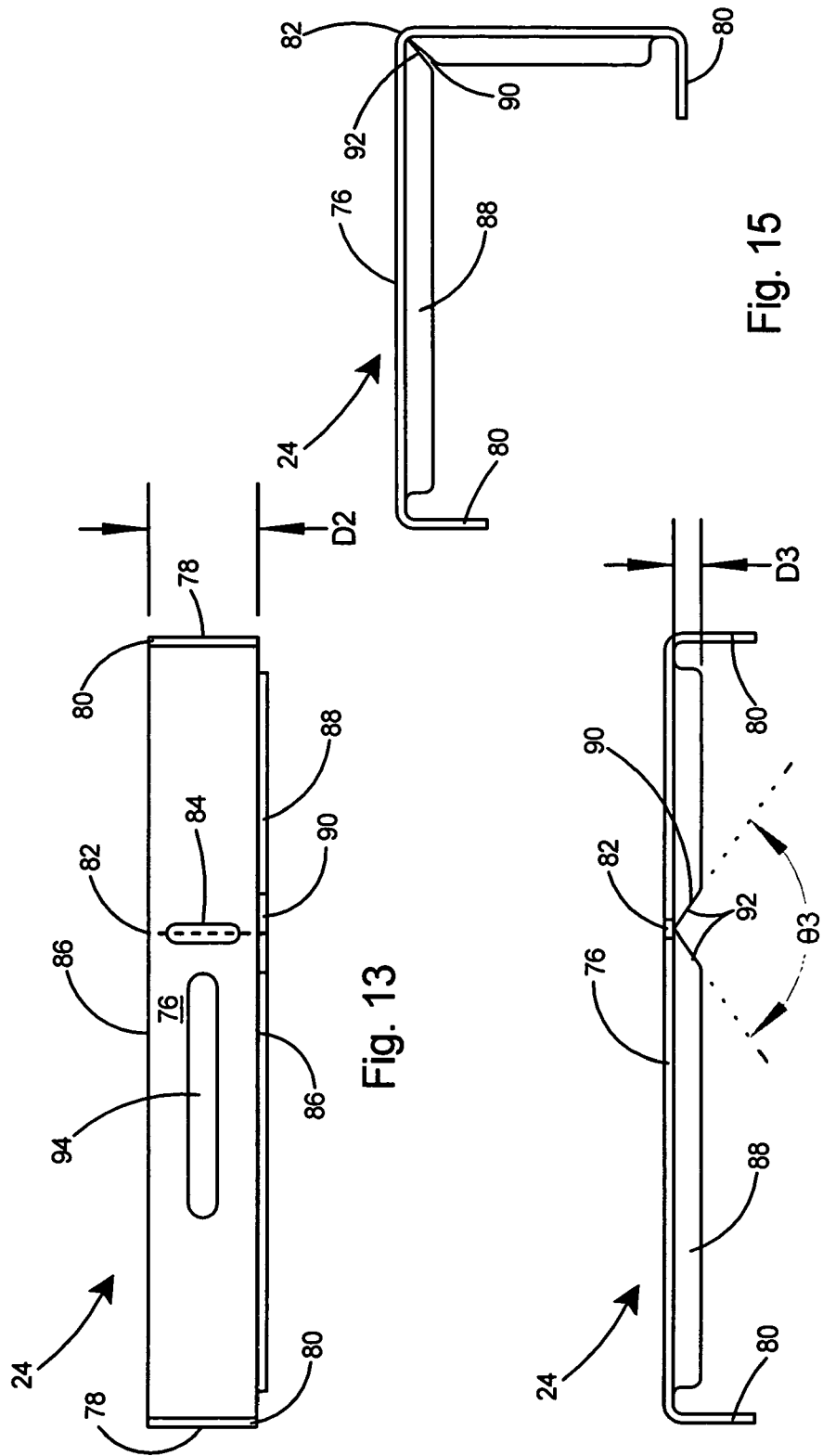

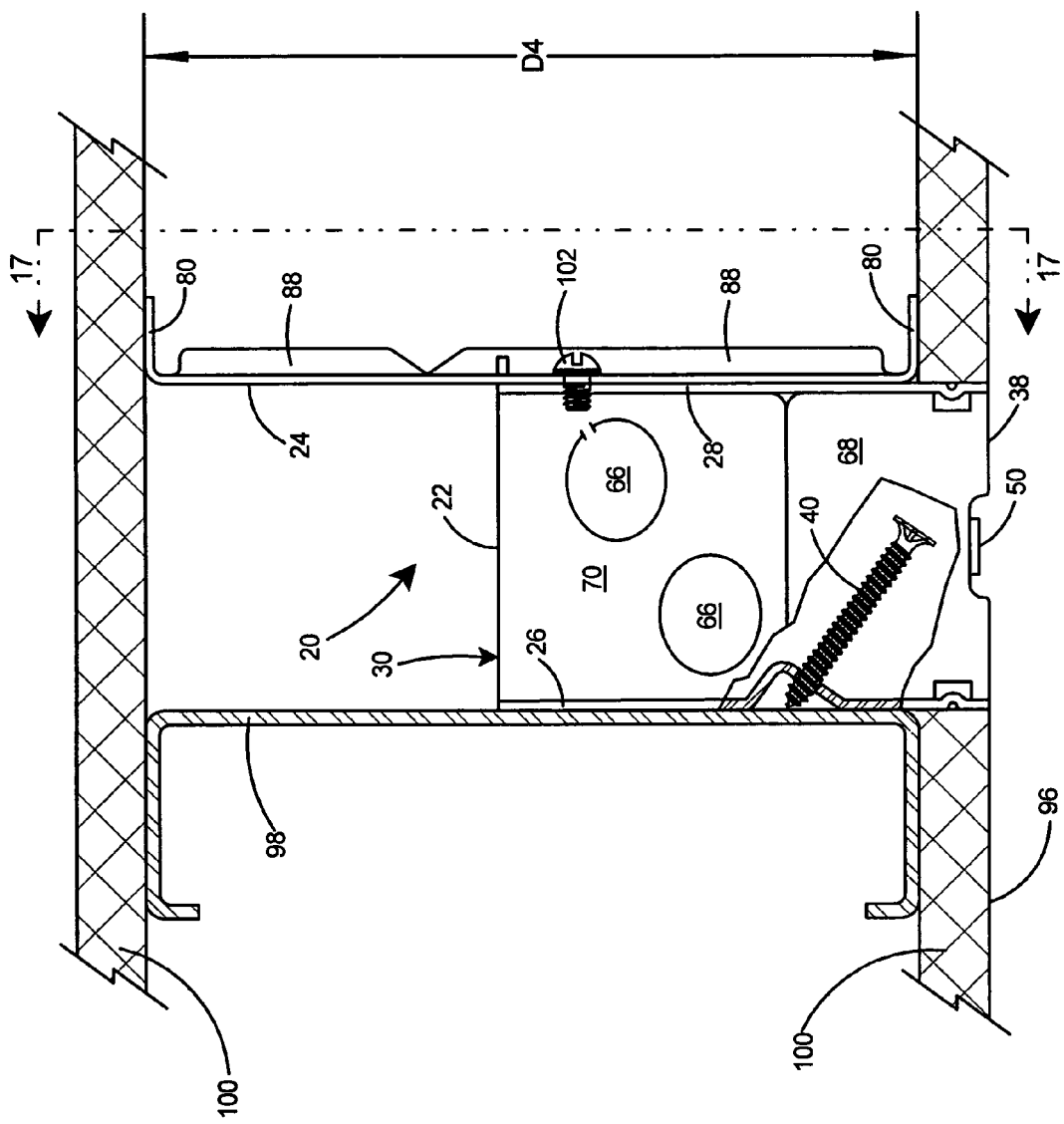

ELECTRICAL BOX ASSEMBLY INCLUDING ADJUSTABLE BRACKET

FIELD OF THE INVENTION

This invention relates to assemblies for the mounting of electrical devices and specifically to an electrical box and adjustable bracket assembly that will provide a secure mounting box for an electrical device on a wall.

BACKGROUND OF THE INVENTION

Many commercial buildings have their frameworks constructed of steel. When the buildings are wired for electricity, electrical boxes are typically secured to the vertical steel studs that form a portion of the building's framework. In wiring a building having a steel framework, typically conventional electrical boxes are secured to the metal studs by driving fasteners through one side of the electrical box.

Although fastening one side of a conventional electrical box to a stud is a routine practice, one problem that arises with continued use of the electrical component, such as repeated connection and disconnection of an electrical plug to a duplex receptacle, is the loosening of the electrical box to the stud. This occurs as a result of the repetitive back and forth movement of the electrical box caused by installing and removing the plug.

Accordingly, there is a need for providing a more secure mounting for an electrical box that is secured to a metal stud. The device for providing a secure electrical box installation should be of simple construction, easy to apply, and should securely brace the electrical box so that it will not become loose with repetitive use.

SUMMARY OF THE INVENTION

The invention is an electrical box assembly for providing a secure electrical enclosure on walls constructed with steel studs of two conventional sizes. The electrical box assembly includes an electrical box including captive fasteners on one sidewall and a bracket that is adjustable in length for attachment to the opposite sidewall. The adjustable length bracket may be used as is for bracing the opposite sidewall of the electrical box for a wide stud. A bend line is provided on the bracket for enabling simple reduction of its length for bracing the electrical box against a narrow stud. The electrical box assembly provides an electrical box that is fastened directly to a stud on one sidewall and braced against the drywall at both ends of the box on the opposite sidewall to securely hold the electrical box with respect to the wall.

OBJECTS AND ADVANTAGES

A first object of the electrical box assembly of the present invention is to provide an electrical box that may be securely mounted to a wall constructed with metal studs.

A second object of the electrical box assembly of the present invention is to provide an electrical box assembly that includes captive fasteners held in a first sidewall of an electrical box for easy access by installers in securing the electrical box assembly to a wall stud.

A third object is to provide an electrical box that, on a sidewall opposite the captive fasteners, is braced against the inside surfaces of the surrounding drywall to prevent movement of the box with repeated use of an electrical component held therein.

A further object is to provide an electrical box assembly that can be secured fast within a wall constructed with either wide or narrow metal studs.

Another object of the present invention is to provide an electrical box assembly that includes an adjustable length bracket for bracing an electrical box within a wall.

Another object of the present invention is to provide an electrical box assembly containing a single bracket for use with walls constructed of either wide or narrow studs.

These and other objects and advantages of the present invention will be better understood by reading the following description along with reference to the drawings.

DESCRIPTION OF THE DRAWINGS

FIG. 13 is a plan view of a preferred embodiment of an adjustable length bracket that forms a portion of the electrical box assembly of FIG. 1.

FIG. 14 is a side view of the adjustable length bracket of FIG. 13.

FIG. 15 is a side view of the adjustable length bracket of FIG. 13 after it has been adjusted to a smaller length according to a second embodiment of the present invention.

FIG. 16 is a top view of the electrical box assembly of the present invention installed within a wall constructed of wide studs according to the present invention and with a portion of the top wall broken away to depict the captive fasteners.

TABLE OF NOMENCLATURE

Figure 1:
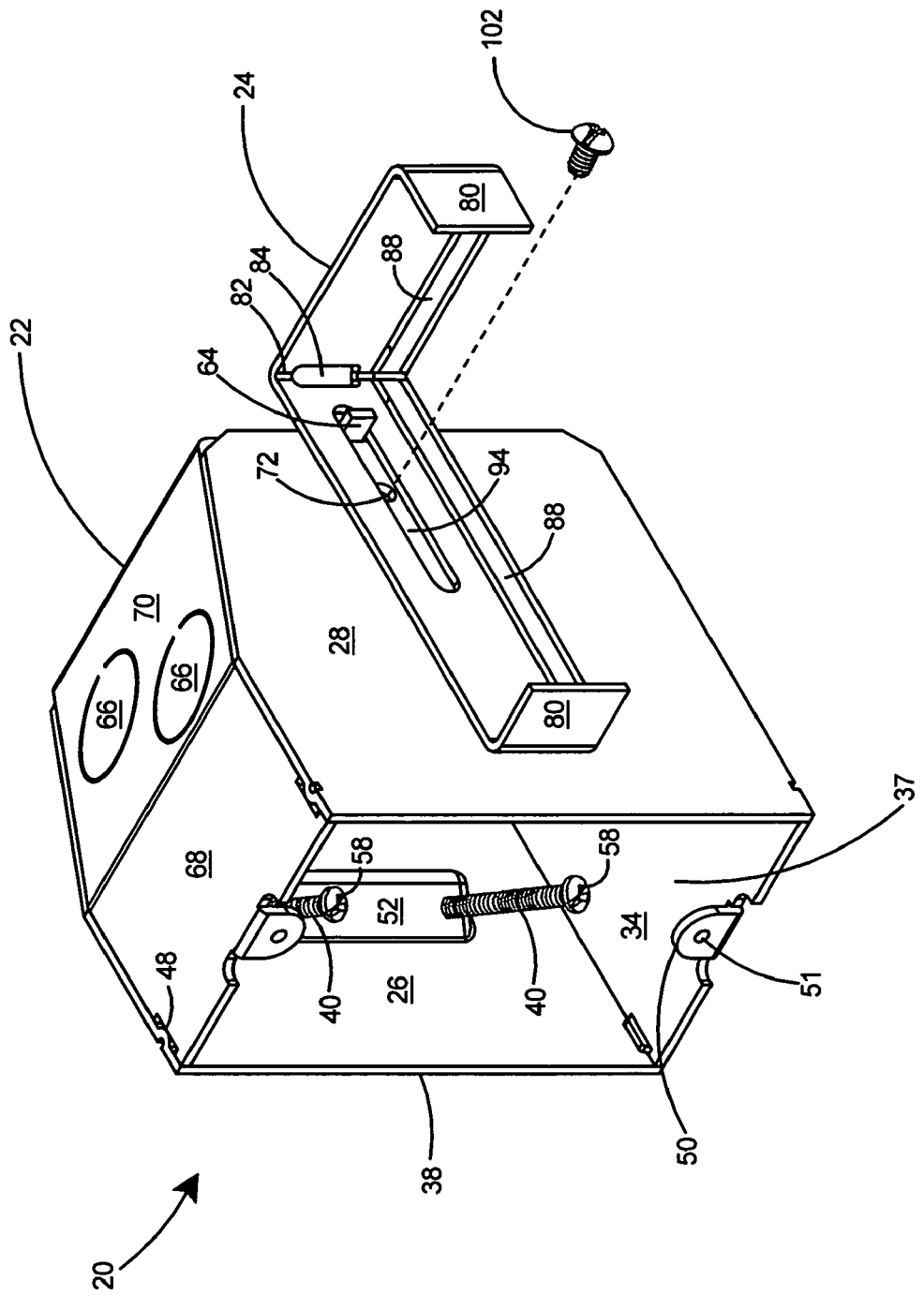
FIG. 1 is a perspective view of a preferred embodiment of an electrical box assembly including an electrical box and an adjustable length bracket.

The following is a listing of part numbers used in the drawings along with a brief description:

| Part Number | Description |
| --- | --- |
| 20 | electrical box assembly |
| 22 | electrical box |
| 24 | adjustable bracket |
| 26 | first sidewall |
| 28 | second sidewall |
| 30 | back wall |
| 32 | top wall |
| 34 | bottom wall |
| 36 | enclosure |
| 37 | front opening |
| 38 | front edge |
| 39 | grounding screw |
| 40 | captive fastener |
| 42 | main panel |
| 44 | first side panel |
| 46 | second side panel |
| 48 | indentation |
| 50 | lug |
| 51 | aperture in lug |
| 52 | inwardly bent sidewall portion |
| 54 | aperture in sidewall portion of first sidewall |
| 56 | end portion of captive fastener |
| 58 | head portion of captive fastener |
| 60 | axis |
| 62 | vertical portion of main panel |
| 64 | alignment tab |
| 66 | removable wall portion |
| 68 | front portion of top wall |
| 70 | rear portion of top wall |
| 72 | aperture in second side panel |
| 74 | groove |
| 76 | base portion of bracket |
| 78 | end |
| 80 | wing |
| 82 | bend line |
| 84 | lateral slot |
| 86 | side of bracket |
| 88 | stiffening rib |
| 90 | v-shaped cutout |
| 92 | edge of cutout |
| 94 | longitudinal slot |
| 96 | wall |
| 98 | 2×6-inch stud |
| 100 | drywall |
| 102 | bracket fastener |
| 104 | horizontal axis |
| 106 | wall |
| 108 | 2×4-inch stud |
| 110 | bent leg |
| D1 | offset distance of lug from front edge of electrical box |
| D2 | width of base portion of bracket |
| D3 | width of stiffening rib |
| D4 | length of bracket in unbent state |
| D5 | separation between alignment and aperture in sidewall |
| D6 | length of bent bracket |
| $\theta_1$ | angle of captive fastener with respect to sidewall |
| $\theta_2$ | angle of rear portion of top wall with respect to front |
| $\theta_3$ | angle between edges at cutout portion of bracket |

DETAILED DESCRIPTION OF THE INVENTION

With reference to FIG. 1, there is shown a preferred embodiment of the present invention, which is an electrical box assembly 20 including an electrical box 22 and a length-adjustable bracket 24.

Figure 2:
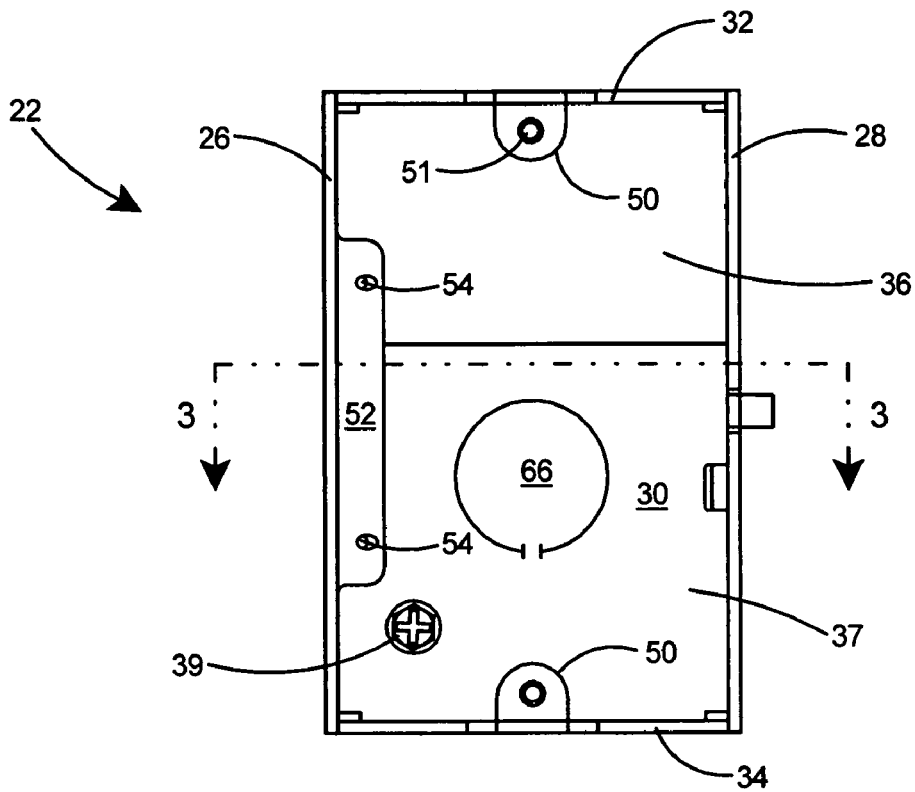
FIG. 2 is a front view of the electrical box portion of the electrical box assembly of FIG. 1.
Figure 3:
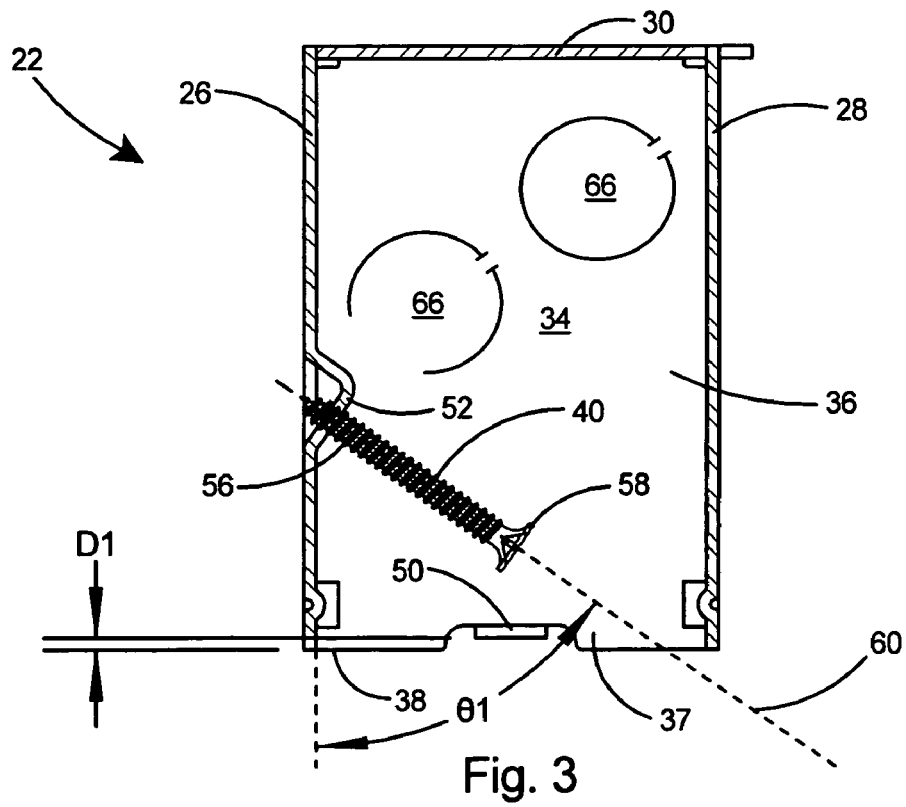
FIG. 3 is a sectional view of the electrical box taken along line 3-3 of FIG. 2.

Referring to FIGS. 2 and 3, the electrical box 22 includes a left or first sidewall 26, a right or second sidewall 28, a back wall 30, a top wall 32, and a bottom wall 34 that define an enclosure 36 with a front opening 37. The electrical box 22 includes a front edge 38 defined by the front edges of the top wall 32, bottom wall 34, and two sidewalls 26 and 28 and a grounding screw 39 secured in the back wall 30. As shown in FIG. 3, the electrical box 22 includes a captive fastener 40 held within the enclosure 36.

Figure 20:
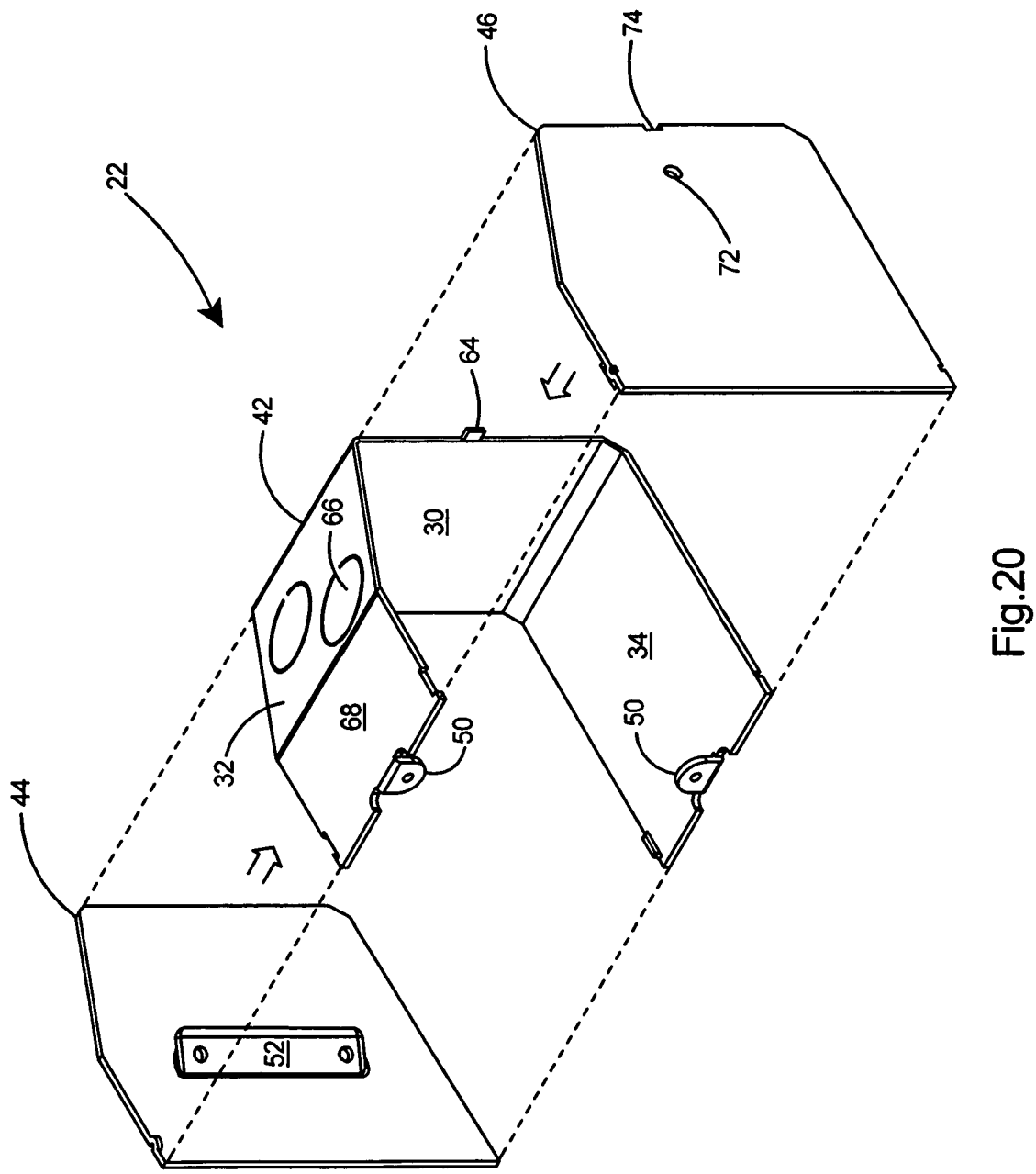
FIG. 20 is an exploded perspective view depicting the main panel and two side panels in alignment to be assembled into the electrical box of the present invention.

As shown in FIG. 20, the preferred embodiment of the electrical box 22 of the present invention includes a main panel 42, and two side panels including a first side panel 44 and second side panel 46. The main panel 42 includes the back wall 30, the top wall 32, and the bottom wall 34 of the electrical box 22. The side panels 44 and 46 are secured to the main panel 42 to form the electrical box 22. Preferably the main panel 42 and the side panels 44 and 46 are constructed of galvanized or plated steel and the side panels 44 and 46 are secured to the main panel 42 by conventional means, such as welding, to construct the electrical box 22. Most preferably the panels 42, 44, and 46 are formed of zinc plated 1010 steel having a thickness of between 0.050 and 0.080 inch and a minimum zinc plating thickness of 0.0005 inch. The panels may include complementary indentations 48 on separate panels that are mated when the panels are joined that form locations to be spot welded.

As shown in FIGS. 2 and 3, lugs 50 having apertures 51 therein are provided extending laterally from the top wall 32 and the bottom wall 30 of the electrical box 22 at the front opening 37. The lugs 50 are offset a slight distance, as denoted by distance D1 in FIG. 3, from the front edge 38 of the electrical box 22.

With reference to FIG. 3, the first sidewall 26 includes an inwardly bent sidewall portion or sidewall portion 52 extending into the enclosure 36. The inwardly bent sidewall portion 52 includes one or more apertures 54 therein and the sidewall portion 52 extends at an angle $\theta_1$ with respect to the front edge 38 of the electrical box 22. The captive fasteners 40 include an end portion 56 and a head portion 58. With end portion 56 of captive fastener 40 secured in aperture 54 of inwardly bent sidewall portion 52, the head portion 58 of the captive fastener 40, as a result of sidewall portion 52 being at angle $\theta_1$ with respect to the front edge 38 of the electrical box 22, is directed toward the front opening 37 of the electrical box 22. Preferably, the captive fastener 40 extends from the inwardly bent sidewall portion 52 at an angle $\theta_1$ of between 50 and 60 degrees with respect to the first sidewall 26. The captive fastener 40 is aligned with the electrical box 22 such that an axis 60 extending through the axial center of the captive fastener 40 extends through the front opening 37 and is clear of the sidewalls 26 and 28 of the electrical box 22. Therefore, the captive fasteners 40 are readily accessible by use of a screwdriver (not shown) or similar tool from the front opening 37 of the electrical box 22.

Figures 4, 5:
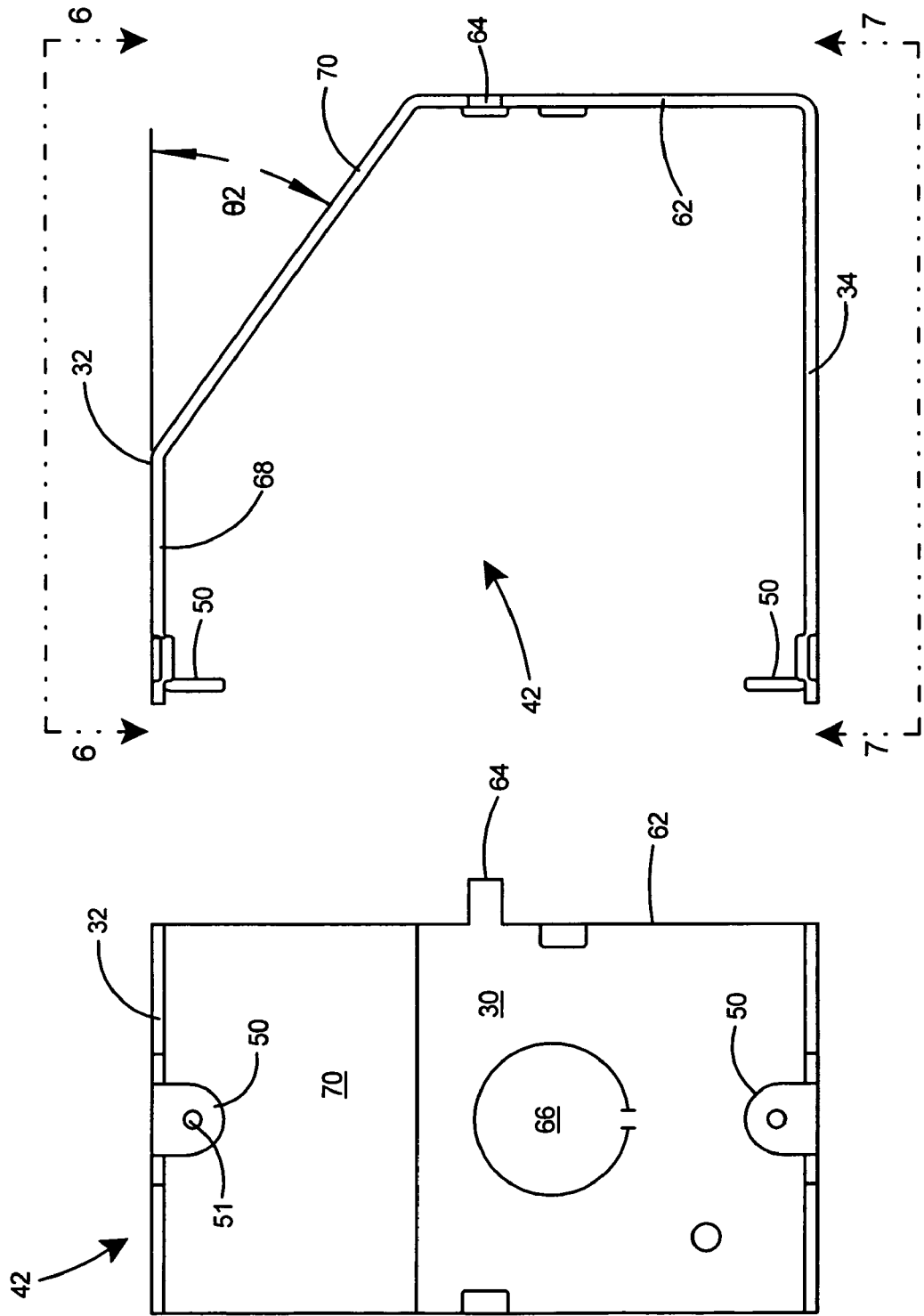
FIG. 4 is an elevation view of a main panel that forms a portion of the electrical box assembly of FIG. 1.
FIG. 5 is a side view of the main panel depicted in FIG. 4.
Figure 6:
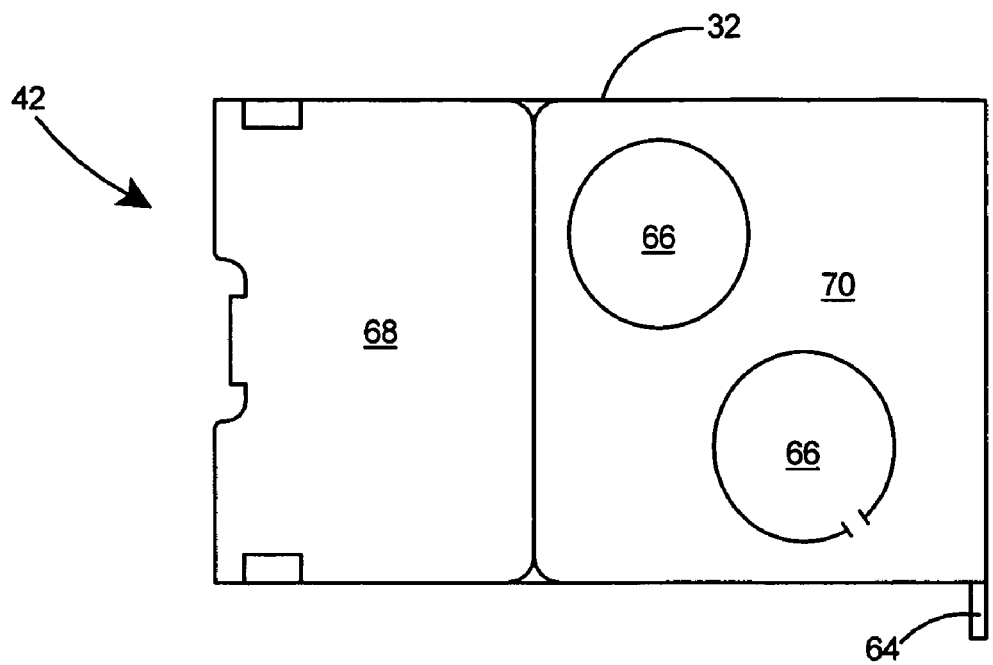
FIG. 6 is a top view of the main panel taken along line 6-6 of FIG. 5.
Figure 7:
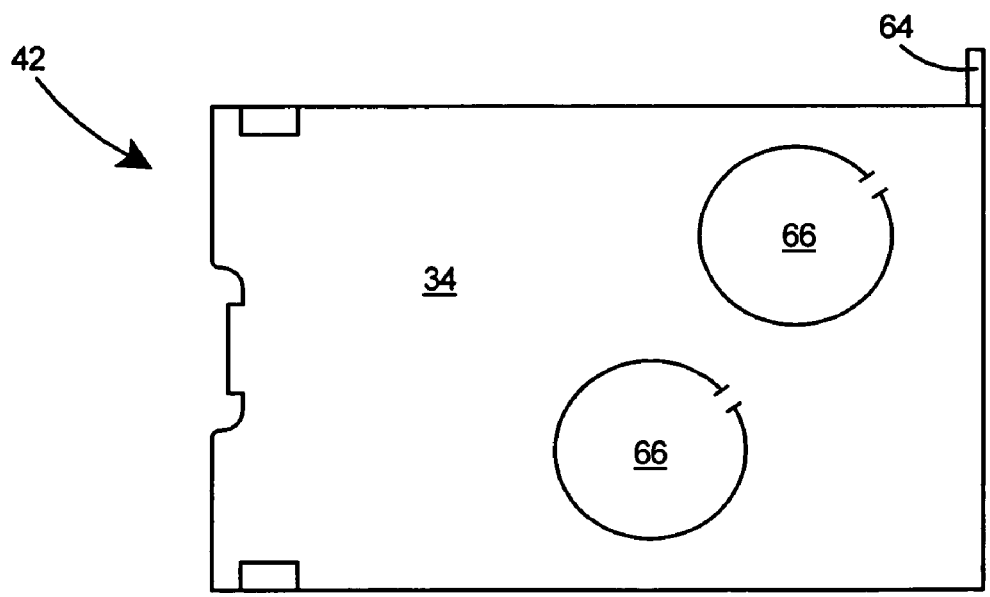
FIG. 7 is a bottom view of the main panel taken along line 7-7 of FIG. 5.

Referring to FIGS. 4 and 5, the main panel 42 includes a vertical portion 62 and at least one alignment tab 64 extending from the vertical portion 62. As shown in FIGS. 4, 6, and 7, the main panel 42 includes one or more removable wall portions 66 in the back wall 30, the top wall 32, and the bottom wall 34. The top wall 32 of main panel 42 includes a front portion 68 and a rear portion 70, with the front portion 68 orthogonal to the back wall 30 of the electrical box 22 and the rear portion 70 of the top wall 32 sloped at an angle $\theta_2$, as shown in FIG. 5, with respect to the front portion 68. Preferably, angle $\theta_2$ is between 30 and 40 degrees.

Figure 9:
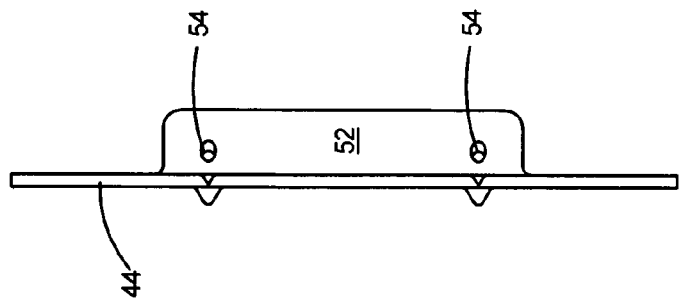
FIG. 9 is a front view of the left-side panel taken from line 9-9 of FIG. 8.
Figure 8:
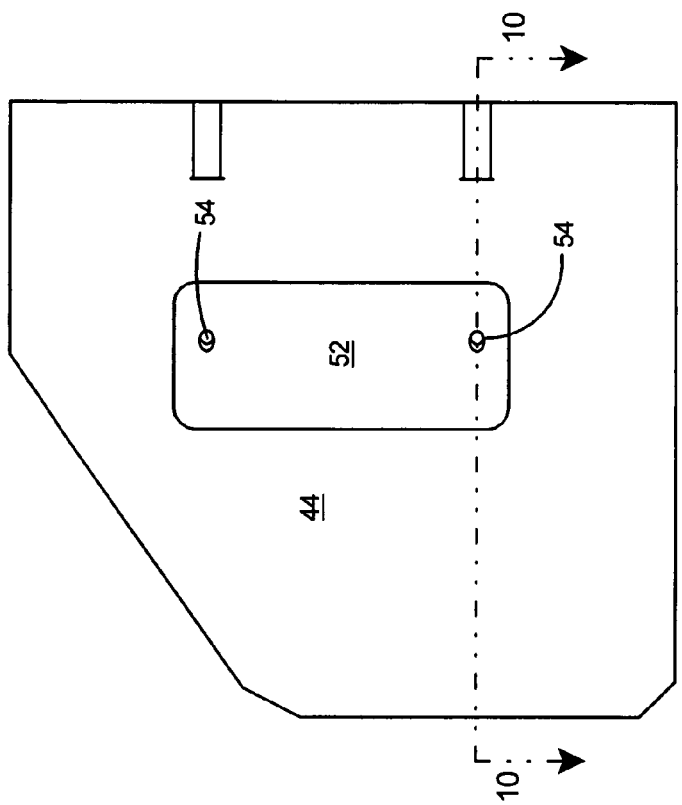
FIG. 8 is an elevation view of a left-side panel that forms a portion of the electrical box assembly of FIG. 1.
Figure 10:
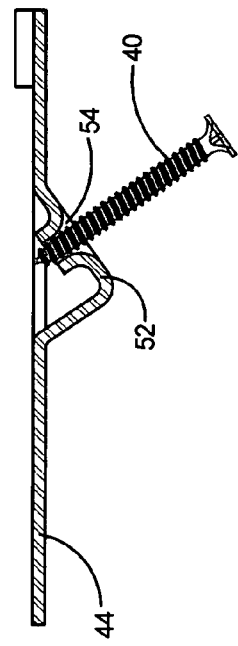
FIG. 10 is a sectional view of the left-side panel taken from line 10-10 of FIG. 8.

With reference to FIGS. 8-10, the first side panel 44 includes the inwardly bent portion or sidewall portion 52 with apertures 54 for accepting and holding the captive fasteners 40 therein.

Figure 11:
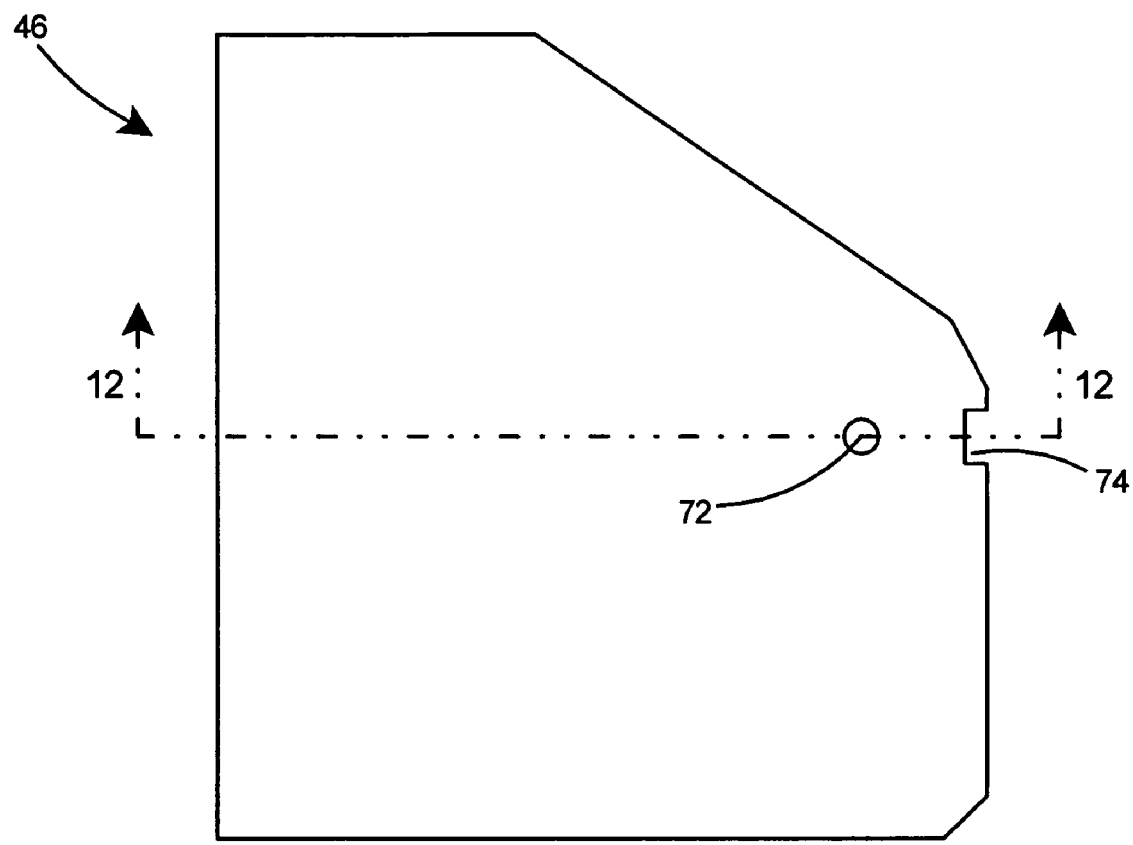
FIG. 11 is an elevation view of a right-side panel that forms a portion of the electrical box assembly of FIG. 1.
Figure 12:
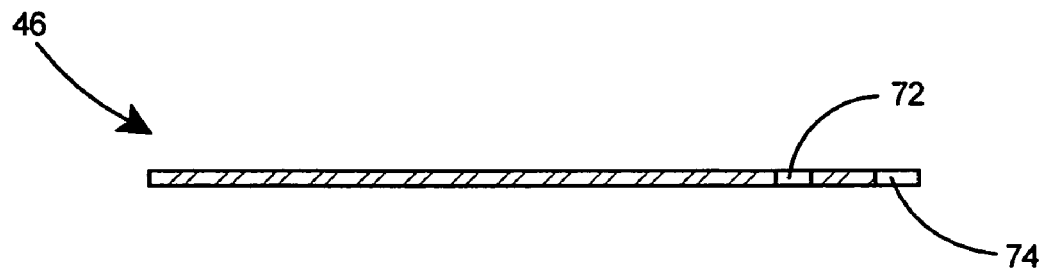
FIG. 12 is a sectional view of the right-side panel taken along line 12-12 of FIG. 11.

As shown in FIGS. 11 and 12, the second side panel 46 includes an aperture 72 and a groove 74 therein which, as shown in FIG. 20, will accommodate the alignment tab 64 of the main panel 42 when aligning and assembling the second side panel 46 to the main panel 42.

Referring to FIGS. 13-14, the adjustable bracket 24 includes a base portion 76 having two ends 78 and an outward extending wing 80 on each end 78 of the base portion 76. As shown in FIG. 14, the outward extending wings 80 are orthogonal to the base portion 76 of the bracket 24. The base portion 76 of the bracket 24 further includes a bend line 82 thereon. The bend line 82 includes a lateral slot 84 extending across a substantial portion of the bracket 24. The bracket 24 further includes two sides 86 and an integral stiffening rib 88 extending longitudinally along one side 86 of the base portion 76. The stiffening rib 88 includes a V-shaped cutout portion 90 at the bend line 82. The cutout portion 90 includes edges 92 thereon and the edges 92 of the cutout portion 90 are separated at an angle Θ3 that is preferably between 90 and 110 degrees. The base portion 76 of the bracket 24 includes a width, denoted by the distance D2 between the sides 86 in FIG. 13. The stiffening rib 88 includes a width, denoted by distance D3 in FIG. 14. Preferably, according to a preferred embodiment of the present invention, the width D3 of the stiffening rib 88 is at least 25 percent of the width D2 of the base portion 76 of the bracket 24. The bracket 24 further includes a substantially long longitudinal slot 94 in the base portion 76.

As shown in FIG. 15, the adjustable bracket 24 may be bent at the bend line 82 to convert it to a shorter length and thereby enable the electrical box assembly to accommodate walls constructed of narrower studs. When bent at the bend line 82, the edges 92 of the cutout portion 90 are in contact or substantially close to one another.

With reference to FIG. 16, there is depicted a top view of a preferred embodiment of the electrical box assembly 20 of the present invention installed within a wall 96 constructed of wide studs 98 such as 2×6-inch metal studs. The electrical box 22 further includes an alignment tab 64 extending outward from the second sidewall 28. The alignment tab 64 extends outward from the second sidewall 28 of the electrical box 22 and through the longitudinal slot 94 (see FIG. 17) of the bracket 24 thereby aligning the bracket 24 with respect to the electrical box 22. The adjustable bracket 24, in its unbent configuration, extends beyond the back wall 30 of the electrical box 22. The bracket 24 in an unbent state is of a length D4 to span between the drywall 100 in a wall 96 constructed of conventional 2×6-inch studs 98.

Figure 17:
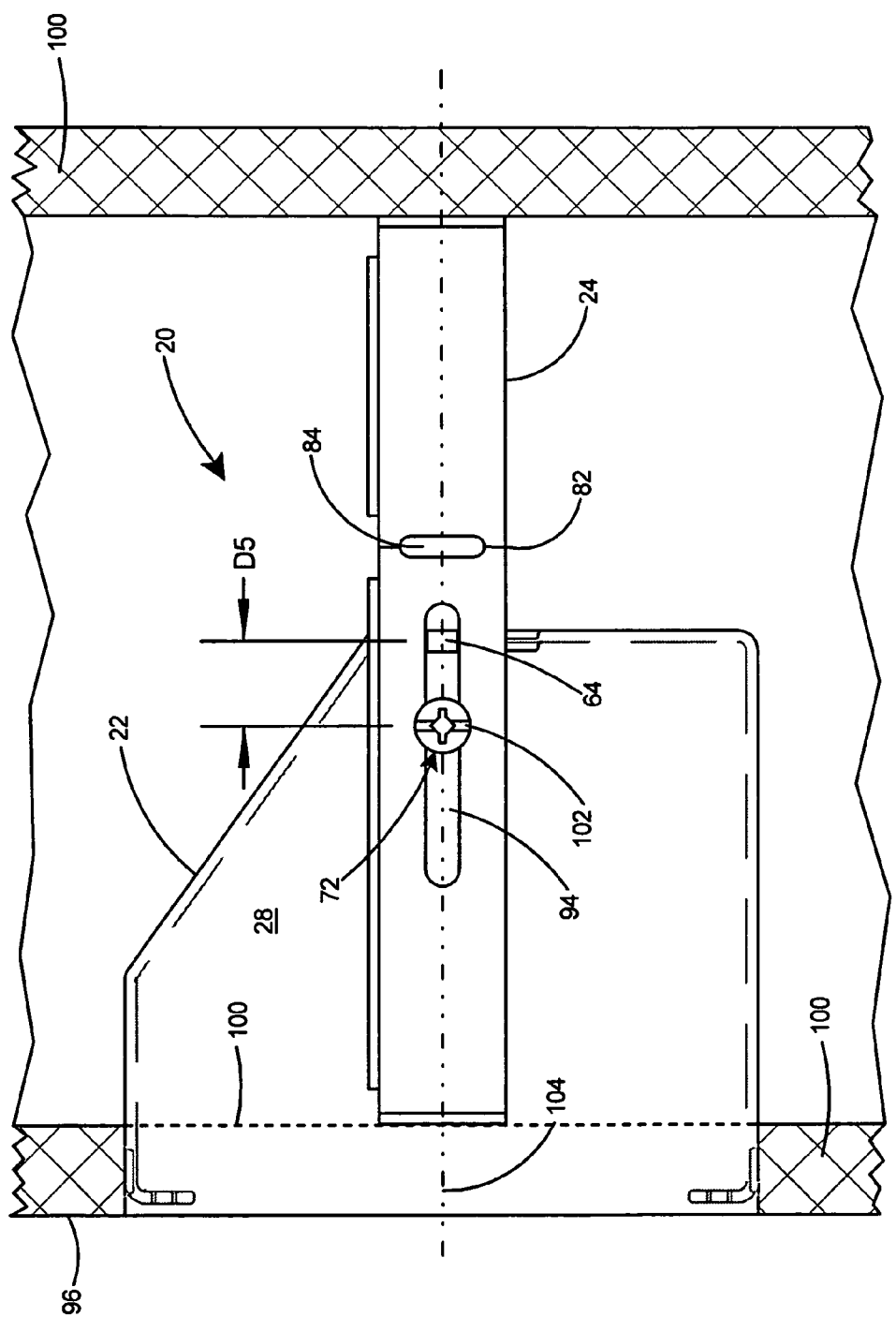
FIG. 17 is a side view of the electrical box assembly taken along line 17-17 of FIG. 16.

As shown in FIG. 17, in the electrical box assembly 20 of the present invention a threaded bracket fastener 102 is provided extending through the longitudinal slot 94 of the bracket 24 and into the aperture 72 of electrical box 22. The alignment tab 64 and the aperture 72 of the second sidewall 28 of the electrical box 22 are in horizontal alignment along horizontal axis 104 across the second sidewall 28 and separated by a substantial distance D5 thereby keeping the bracket 24 in horizontal alignment with respect to the electrical box 22 as the bracket 24 is slid with respect to the electrical box 22. Bracket 24 may therefore be adjusted with respect to electrical box 22 to slide both wings 80 of bracket 24 flush with each drywall 100 surface.

Figure 18:
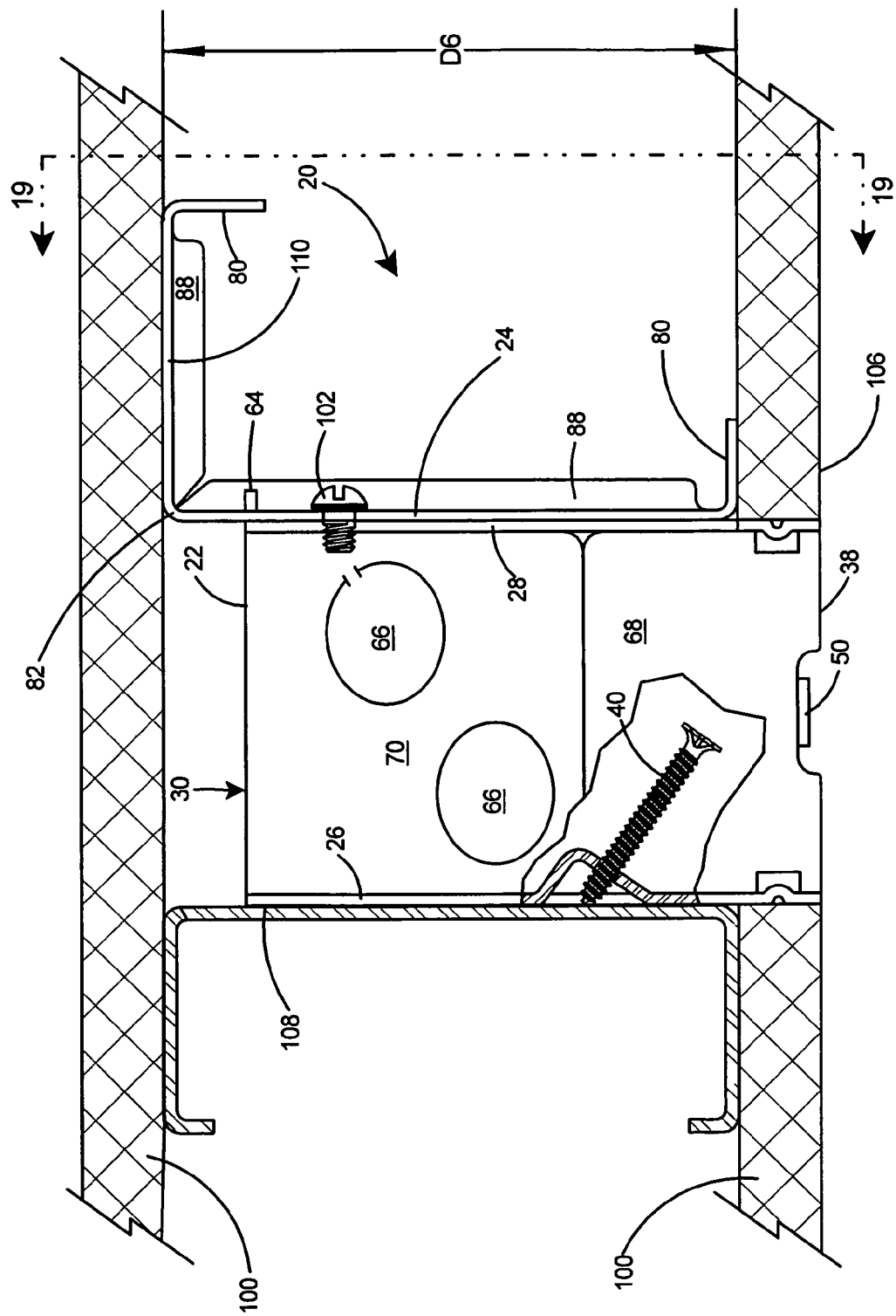
FIG. 18 is a top view of the electrical box assembly of the present invention installed within a wall constructed of narrow studs according to the present invention and with a portion of the top wall broken away to depict the captive fasteners.

With reference to FIG. 18, there is depicted a top view of a preferred embodiment of the electrical box assembly 20 of the present invention installed within a wall 106 constructed of narrow studs 108 such as 2×4-inch metal studs. To accommodate a wall 106 constructed with 2×4-inch studs, the adjustable bracket 24, is bent at a 90 degree angle at bend line 82. The bent bracket 24 is of a length D6 to span between the drywall 100.

Figure 19:
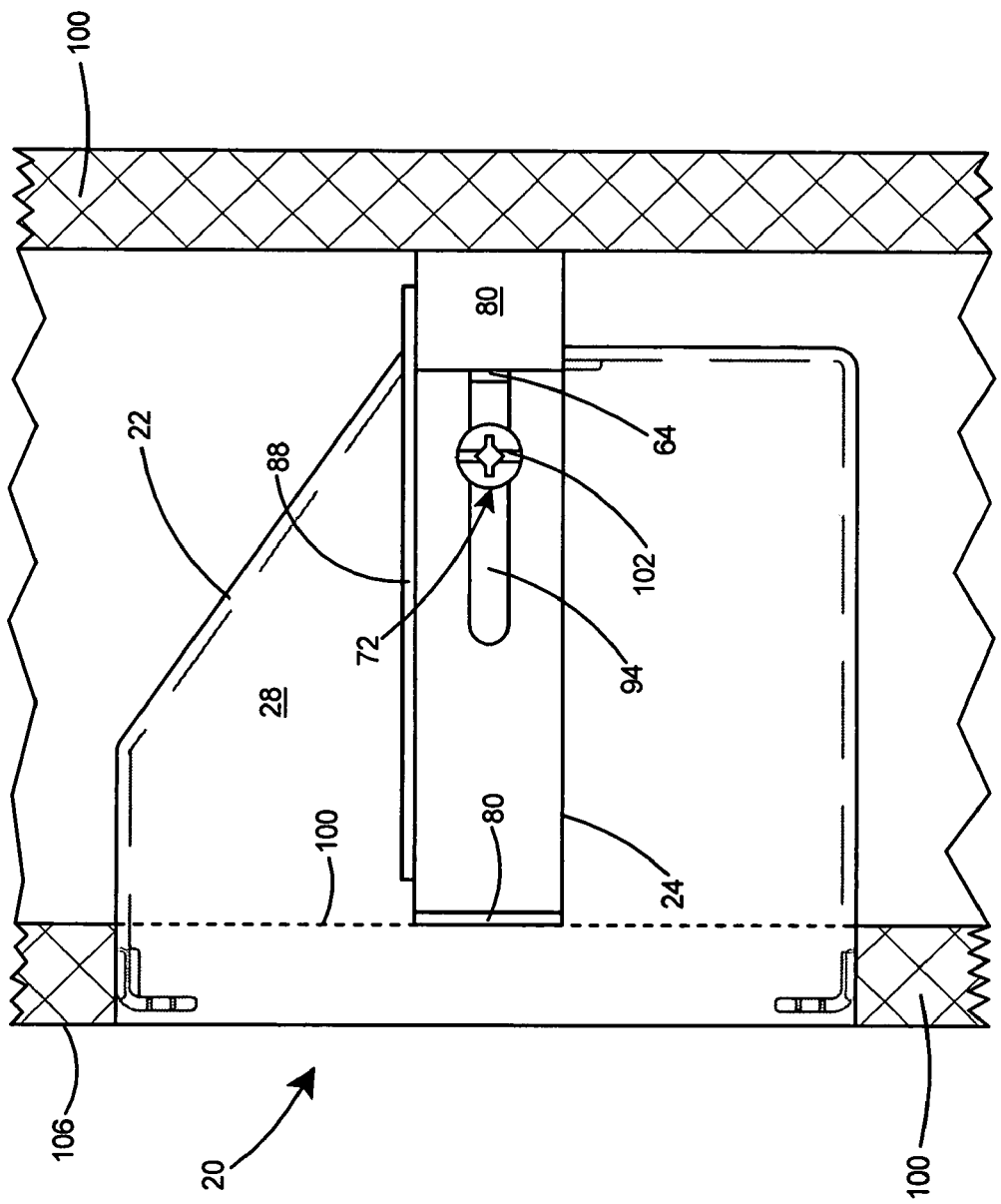
FIG. 19 is a side view of the electrical box assembly taken along line 19-19 of FIG. 18.

As shown in FIG. 19, the alignment tab 64, extending outward from the second sidewall 28 of the electrical box 22, can be loosened to enable adjustment of the bracket 24 with respect to the electrical box 22 so that both ends of the bracket 24 are flush with the drywall 100 as shown in FIG. 19. The long length of the longitudinal slot 94 enables a substantial adjustment of the bracket 24 with respect to the electrical box 22.

As shown in FIG. 1, the electrical box assembly 20 of the present invention is provided with the bracket 24 attached to the electrical box 22 with bracket fastener 102. Two captive fasteners 40 are secured therein in inwardly bent sidewall portion 52. The heads 58 of captive fasteners 40 are within the enclosure 36 but angled towards and near the front opening 37 of the electrical box 22. Captive fasteners 40 are preferably self-tapping and constructed of hardened steel. The electrical box assembly 20 is typically installed after the wall studs are in place and the rear drywall panel has been installed (see FIGS. 17 and 19).

With reference to FIG. 16 for operation of the present invention on a wall constructed of 2×6-inch studs, the bracket 24 is left in its unbent state, the first sidewall 26 is placed flush against the stud 98 with the front edge 38 of the box 22 extending beyond the stud by the thickness of the front drywall panel 100, and the electrical box 22 is secured to the stud 98 by driving the captive fasteners 40 into the stud. The bracket 24 can then be adjusted with respect to the electrical box 22 by loosening bracket fastener 102, sliding rear wing 80 of bracket 24 against the rear drywall panel 100, and retightening the bracket fastener 102.

With reference to FIG. 18, the electrical box assembly 20 is operated in the same manner for a wall constructed of 2×4-inch studs 108, except the bracket 24 is first bent 90 degrees at bend line 82 to accommodate the narrower wall space. After the captive fasteners 40 are driven into the stud to secure one side of the electrical box 22 to the stud, the bracket 24 is loosened and slid toward the rear of the electrical box 22 until the bent leg 110 is flush against the rear drywall panel. After the adjusting bracket fastener 102 is tightened, the front wing 80 should be flush with the front drywall panel.

Having thus described the invention with reference to a preferred embodiment, it is to be understood that the invention is not so limited by the description herein but is defined as follows by the appended claims.

What is claimed is:

1. An electrical box assembly comprising:
   an electrical box having a first sidewall, a second sidewall, a back wall, a top wall, and a bottom wall defining an enclosure therein;
   a front edge on said electrical box;
   said first sidewall including an inwardly bent portion forming a sidewall portion extending into said enclosure, said sidewall portion including an aperture therein;
   a captive fastener having an end portion secured in said aperture of said sidewall portion, said end portion of said captive fastener held in said sidewall portion, said captive fastener including a head portion extending into said enclosure;
   a portion of said sidewall portion at an angle with respect to said front edge of said electrical box such that said head portion of said captive fastener is directed toward said front edge of said electrical box;
   an adjustable bracket secured to said second sidewall of said electrical box, said adjustable bracket extending beyond said back wall of said electrical box, said adjustable bracket including two sides and a bend line beyond said back wall of said electrical box;

an integral stiffening rib extending longitudinally along one side of said base portion of said bracket, said stiffening rib including a cutout V-shaped portion at said bend line; and said adjustable bracket capable of being adjusted in length by bending said adjustable bracket at said bend line.

2. The electrical box assembly of claim 1 including
a base portion on said bracket;
an outward extending wing on each end of said base portion of said bracket; and
said outward extending wings orthogonal to said base portion of said bracket.

3. The electrical box assembly of claim 2 wherein
said bend line is in said base portion of said bracket; and
said bend line includes a lateral slot extending across a portion of said base portion of said bracket.

4. The electrical box assembly of claim 1 wherein
said cutout portion of said stiffening rib includes edges; and
said edges of said cutout portion are separated at an angle of between 90 and 110 degrees.

5. The electrical box assembly of claim 4 wherein
said base portion of said bracket includes a width between said sides;
said stiffening rib includes a width; and
said width of said stiffening rib is at least 25 percent of the width of said base portion of said bracket.

6. The electrical box assembly of claim 4 wherein said edges of said cutout portion are in contact or substantially close to one another when said bracket is bent at said bend line.

7. The electrical box assembly of claim 2 wherein
said bracket in an unbent state is of a length to span between the drywall in a wall constructed of conventional 2×6-inch studs; and
said bracket when bent at said bend line is of a length to span between the drywall in a wall constructed of conventional 2×4-inch studs.

8. The electrical box assembly of claim 7 wherein each of said outward extending wings is flush with said drywall in walls constructed of either size of said conventional studs.

9. The electrical box assembly of claim 2 including
a longitudinal slot in said base portion of said bracket;
an alignment tab extending outward from said second sidewall of said electrical box; and
said alignment tab of said electrical box extends through said longitudinal slot of said bracket and aligns said bracket with respect to said electrical box.

10. The electrical box assembly of claim 9 including
an aperture in said second sidewall of said electrical box;
a threaded fastener extending through said longitudinal slot of said bracket and into said aperture in said electrical box; and
said threaded fastener when tight securing said bracket to said electrical box and when loosened enabling sliding of said bracket with respect to said electrical box, said longitudinal slot including a substantial length to enable substantial adjustment of said bracket with respect to said electrical box.

11. The electrical box assembly of claim 10 wherein said alignment tab and said aperture of said second sidewall of said electrical box are in horizontal alignment across said second sidewall and separated by a substantial distance thereby keeping said bracket in horizontal alignment with respect to said electrical box as said bracket is slid with respect to said electrical box.

12. The electrical box assembly of claim 1 wherein
said electrical box includes a front opening;
said captive fastener extends from said sidewall portion at an angle of between 50 and 60 degrees with respect to said first sidewall; and
said captive fastener is aligned with said electrical box such that a line extending through the axial center of said captive fastener extends through said front opening and clear of said sidewalls of said electrical box.

13. The electrical box assembly of claim 12 including
lugs extending laterally from said top wall and said bottom wall of said electrical box at said front opening,
apertures in said lugs; and
said lugs offset a slight distance from said front edge of said electrical box.

14. The electrical box assembly of claim 1 including one or more removable wall portions in said back wall, said top wall, and said bottom wall of said electrical box.

15. The electrical box assembly of claim 1 wherein
said top wall includes a front portion and a rear portion;
said front portion of said top wall orthogonal to said back wall of said electrical box; and
said rear portion of said top wall is sloped at an angle of between 30 and 40 degrees with respect to said front portion of said top wall.

16. The electrical box assembly of claim 15 wherein said rear portion of said top wall includes one or more removable wall portions therein.

17. The electrical box assembly of claim 1 wherein
said electrical box includes a main panel and two side panels;
said main panel includes said back wall, said top wall, and said bottom wall;
said side panels are secured to said main panel to form said electrical box;
said main panel includes a vertical portion;
at least one tab extending from said vertical portion of said main panel; and
a first of said side panels includes a groove therein, whereby said tab of said main panel enables alignment and assembly of said main panel and said first side panel.

18. The electrical box assembly of claim 17 wherein
said main panel and said side panels are constructed of galvanized steel; and
said side panels are welded to said main panel to construct said electrical box.

* * * * *